United States Patent
Bhakta et al.

(10) Patent No.: US 8,031,972 B2
(45) Date of Patent: Oct. 4, 2011

(54) SYSTEM FOR DYNAMICALLY RESIZING INFORMATION HANDLING SYSTEM IMAGES

(75) Inventors: Arpan Bhakta, Pflugerville, TX (US); Thomas Phipps, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1215 days.

(21) Appl. No.: 11/612,161

(22) Filed: Dec. 18, 2006

(65) Prior Publication Data

US 2008/0144974 A1    Jun. 19, 2008

(51) Int. Cl.
  *G06K 9/32* (2006.01)
  *G06K 9/54* (2006.01)
(52) U.S. Cl. ............................ 382/298; 382/305
(58) Field of Classification Search .............. 382/298, 382/293, 300, 305; 715/252, 234, 238; 718/1
See application file for complete search history.

(56) References Cited

U.S. PATENT DOCUMENTS

| | | | | |
|---|---|---|---|---|
| 7,111,240 B2 | | 9/2006 | Crow et al. | 715/723 |
| 7,430,712 B2* | | 9/2008 | Arokiaswamy | 715/234 |
| 2006/0184937 A1* | | 8/2006 | Abels et al. | 718/1 |

OTHER PUBLICATIONS

Short, Dan "Web Shorts Site Design—Dynamically Resize an Image" http://www.web-shorts.com/mm/DynamicResize/default.asp, Mar. 7, 2007 (2 pages).
Short, Dan Dynamically Resize an Image—Dreamweaver MX and UltraDev Zone—DMXzone—DMXzone.com:, http://www.dmxzone.com/ShowDetail.asp?NewsId=483, Mar. 7, 2007 (13 Pages).
Traversa, Eddie "FAQTs—Knowledge Base—View Entry—How to Dynamically Resize an Image According to Browser Dimensions" http://www.faqts.com/knowledge_base/view.phtml/aid/7613, Feb. 7, 2001 (4 pages).

* cited by examiner

*Primary Examiner* — Yon Couso
(74) *Attorney, Agent, or Firm* — Hamilton & Terrile, LLP; Stephen A. Terrile

(57) ABSTRACT

A system for dynamically resizing information handling system images which dynamically resizes information handling system images and enables presentation of images (such as product images) at multiple sizes in a consistent compression/quality ratio without having to create a new offline batch process for each image dimension and without requiring manual image manipulation.

17 Claims, 6 Drawing Sheets

SYSTEM FOR DYNAMICALLY RESIZING INFORMATION HANDLING SYSTEM IMAGES

BACKGROUND OF THE INVENTION

1. Field of the Invention

The present invention relates to information handling system images and more particularly to dynamically resizing information handling system images.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide on-line stores with the capability to custom configure and order a particular system. Known on-line stores offer customers the ability to select and price key system options, the ability to include multiple systems on a single order, and the ability to provide information necessary for the placement of a standard system order.

It is known to provide the capability to self-select system options and then price the options provided via an on-line configurator. This configurator enables customer selection of key, system-defining components from a display of available system options for a chosen system. The capability to include multiple items in a single order is afforded by the presence of a "shopping cart", where the shopping cart represents an equivalent to the traditional shopping cart. The shopping cart enables customers to group disparate systems together as an order, as well as specify a quantity for each individual system to be included on the order. Furthermore, the capability to provide customer-specific information required for the placement of a standard order is provided via an on-line "checkout", the checkout including essentially a form for facilitating the capture of requested and required information. The checkout form includes simple logic rules to assure entry of the required fields.

On-line stores are an example of a system that presents images to a customer, e.g., during the process of ordering or configuring a product. Often a particular image may be presented as different sized images in various locations within the on-line store. So for example, one size of a particular image may be presented in one part of the on-line store while a different size of the particular image may be presented in another part of the online store. In known systems, each of these different sizes of the particular image are stored as separate files which are accessed by the on-line store. This can present an issue as certain applications can use many images where each of the images include many sizes all of which are stored for access by the application. Thus, the size of the storage can grow to be quite large. Also, management of all of the different sizes of a particular image can be challenging. For example, when a particular image is updated, each of the different sizes of the updated image should also be updated. Also, creating each of the different sizes for many images can be very time intensive, which can in turn slow down release of a new version of the application which is accessing the images.

Accordingly, it would be desirable to provide a system for dynamically resizing images when multiple sizes of a particular image are needed by an application.

SUMMARY OF THE INVENTION

In accordance with the present invention, a system for dynamically resizing information handling system images is set forth. The system for dynamically resizing information handling system images enables presentation of images (such as product images) at multiple sizes in a consistent compression/quality ratio without having to create a new offline batch process for each image dimension and without requiring manual image manipulation Thus for example, a large image size (e.g., 500×500 pixels) from an accessories domain does not have to be manually recreated to be presented as a medium image size (e.g., 315× 315 pixels) which is presented within a portion of a configurator.

The system for dynamically resizing information handling system images uses a filename and image size in the path of a URL as sent in a browser. The system accesses a server side cache container for a previously loaded image. Then if the image is not found within the server side cache container, the system loads the file from the file system in memory and uses a .net interface and a graphical device interface component (e.g., GDI+) to resize the image and compress the image if necessary. The image is then serialized to a byte array and stored in cache. The image is then sent out through the response stream to the browser of the customer.

This solution may be applied to any type of application in which multiple image sizes are desired. For example, the dynamic resize function may be used to reference the accessories domain from a high level domain (e.g., a main web page domain) so that content teams would not have to manually recreate imagery that exists within a lower level domain (e.g., an accessories domain).

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An on-line store is one component of an Internet website to which a customer may go to configure a particular information handling system, for example, according to desired options of the customer. The on-line store is typically a subset of a larger Internet website. At the on-line store, a customer can select one or more products in which the customer is interested. Upon selection of a particular product, the on-line store presents the customer with the ability to go to the product information for the particular product, customize the product, price the customized product, purchase the product, and other actions as discussed herein. While shopping happens in the website (i.e., selection of a particular kind of system by a customer), when the customer is ready to purchase a customized system, the customer is then directed to that part of the website which the on-line store application controls.

Figure 1:
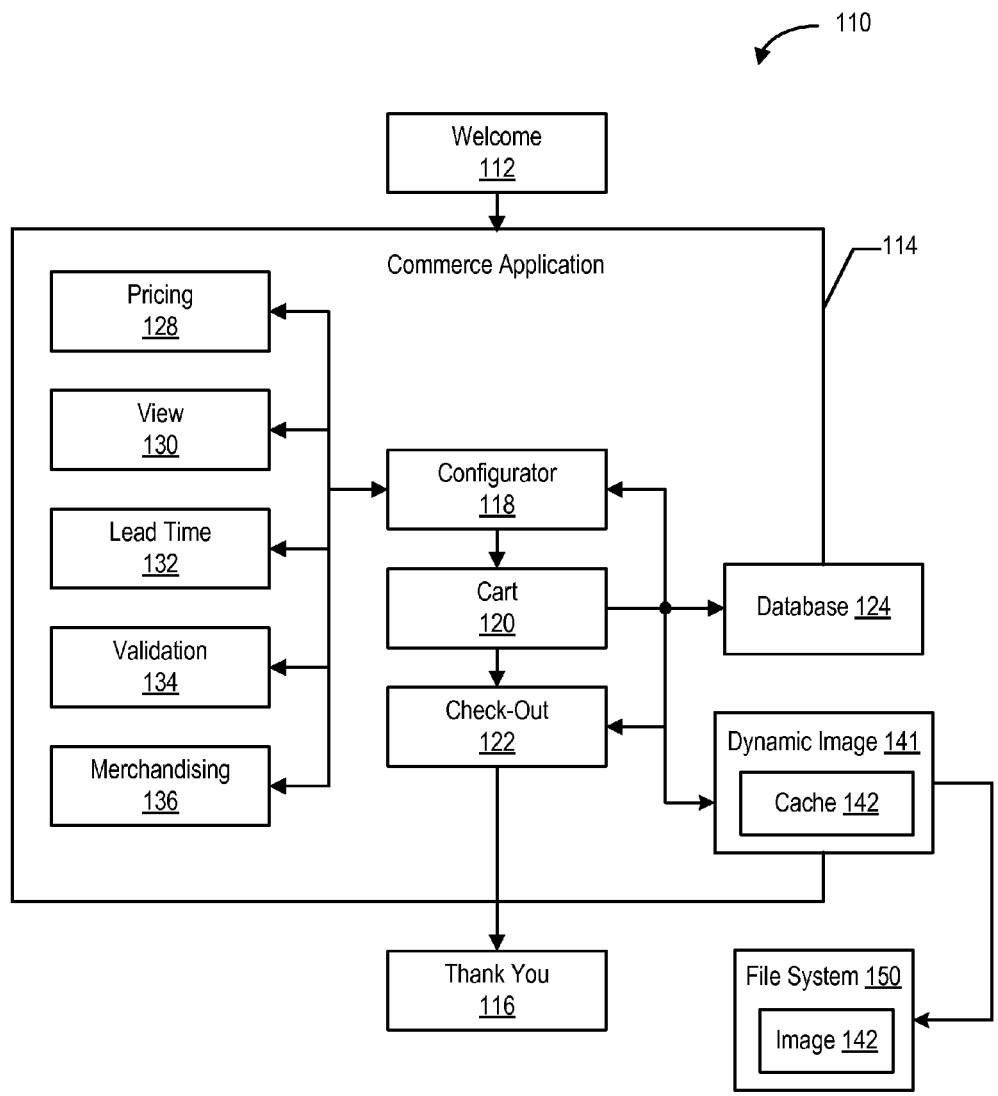
FIG. 1 shows an overview block diagram representation of an on-line store.

Referring now to FIG. 1, an on-line store 110 for use in generating customer configured information handling systems, e.g., customer configured computer systems, is shown. The on-line store 110 includes a welcome or introductory module 112, a commerce application module 114, and a thank you module 116. The on-line store 110 includes an on-line store user interface which enables the system configuration, pricing, and ordering of an information handling system via the Internet. The commerce application 114 includes a configurator 118, shopping cart 120, a checkout module 122, a services activation module 123 and database 124. The database 124 provides information to the configurator 118, shopping cart 120, checkout module 122 and services activation module 123. The configurator 118 includes a pricing module 128, a view module 130, a lead time warning module 132, a validation (or compatibility) warning module 134, and a merchandising module 136. The various modules of the configurator 118 are driven by data from the database 124, and thus the configurator 118, shopping cart 120, checkout module 122 and services activation module 123 are all linked to the database 124.

The configurator 118 also includes a dynamic image resize module 140, which includes an image cache 142. The database 124 includes an image store portion 150 in which images used by the on-line store 110 are stored.

In operation of the on-line store 110, the welcome module 112 presents a welcome page 112, the configurator 118 presents a configurator page, the shopping cart 120 presents a shopping cart page, the checkout module 122 presents a checkout page, the services activation module 123 presents a services activation page, and the thank you module 116 presents a thank you page. The welcome page includes a static page and generally resides outside of the commerce application 114. The configurator page, shopping cart page, checkout page and services activation page are within the commerce application and use information provided by the database. The checkout includes a payment feature, delivery feature, personal verses business feature, and instructional text features (i.e., how to fill out an on-line form.)

The welcome page is typically an introductory page and includes a link into the on-line store 110. The welcome page is typically a static welcome page. Upon completion of configuration of a system, the customer is transferred to a checkout page. After completion of the checkout, a customer is transferred to a services activation page in which the customer is provided an opportunity to activate various services such as internet service or content services such as music services. After completion of the services activation module 123, the customer is transferred to a static thank you page 116. The thank you page 116 provides a message of gratitude to the customer for having placed the order or for visiting the on-line store.

Aspects of the configurator 118 which interact with database 124 are shown in FIG. 1. In essence, the entire commerce application 114 interacts with the database. The configurator 118, shopping cart 120, checkout module 122 and services activation module 123 are each part of the commerce application 114 and interact with the database 124. For example, with the shopping cart 120, additional merchandising information associated with a particular system which has been configured and placed in the shopping cart by an on-line store customer can be provided.

The on-line store also includes a dynamic image resize module 140, which includes an image cache 142. The dynamic image resize module 140 interacts with a file system 150 which includes an image storage portion 152. The image storage portion 152 stores images that are accessed by the dynamic image resize module 140. The dynamic image resize module 140 enables presentation of images (such as product images) at multiple sizes in a consistent compression/quality ratio without having to create a new offline batch process for each image dimension and without requiring manual image manipulation. Thus for example, a large image size (e.g., 500×500 pixels) from an accessories domain does not have to be manually recreated to be presented as a medium image size (e.g., 315×315 pixels) which is presented within a portion of a configurator.

The dynamic image resize module dynamically resizes information handling system images using a filename and an image size in the path of a URL as sent in a browser. The module 140 accesses the cache 142 to determine whether the image corresponding to the URL was previously loaded. If the image is not found within the cache container 142, the module 140 loads the file from the image portion 152 of the file system 150 and uses a .net interface and a GDI component (such as GDI+) to resize the image and compress the image if necessary. The image is then serialized to a byte array and stored in the cache 142. The image is then sent out though the response stream to the browser of the customer.

Figure 2:
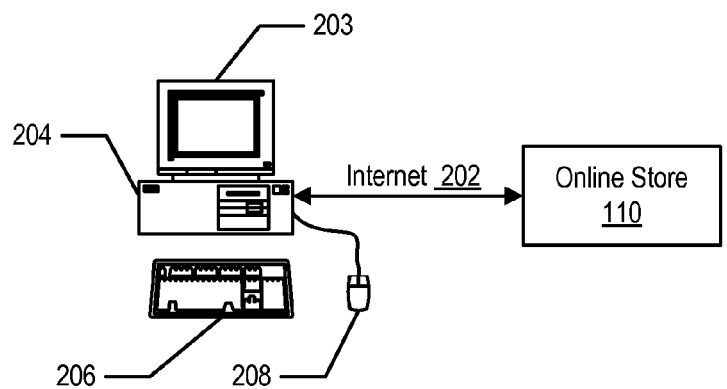
FIG. 2 shows access to the on-line store via the Internet using a computer system.

Referring to FIG. 2, a customer can access the on-line store 110 using any suitable computer equipment 200, via the Internet 202. The computer equipment 140 may include a display 203, computer 204, keyboard 206, and pointing device 208. Display 203 is used for displaying the various pages of the on-line store (including images presented within the pages) while a customer is using the on-line store.

Figure 3:
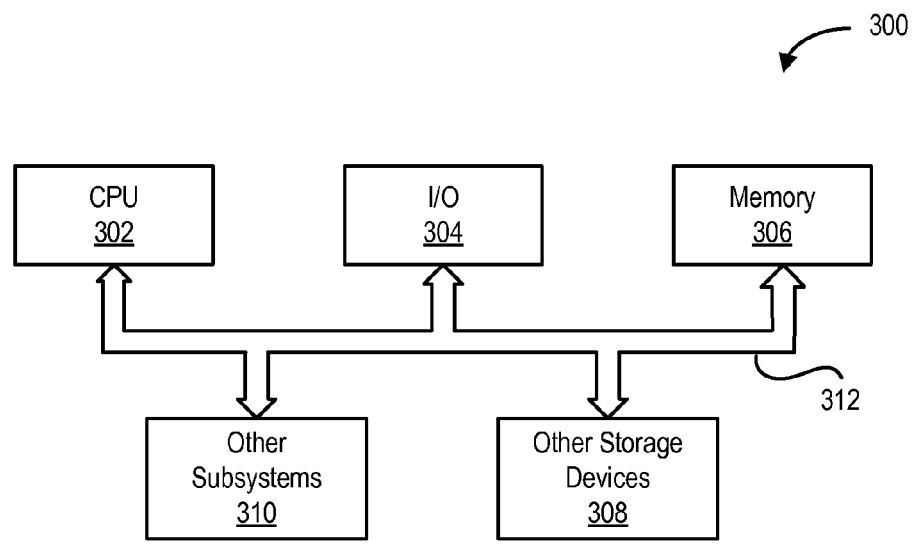
FIG. 3 shows a system block diagram of an information handling system.

Referring briefly to FIG. 3, a system block diagram of an information handling system 300 is shown. The information handling system 300 includes a processor 302, input/output (I/O) devices 304, such as a display, a keyboard, a mouse, and associated controllers, memory 306 including volatile memory such as Random Access Memory (RAM) and non-volatile memory such as a hard disk and drive, and other storage devices 308, such as an optical disk and drive and other memory devices, and various other subsystems 310, collectively, all interconnected via one or more buses 312.

For purposes of this invention, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 4:
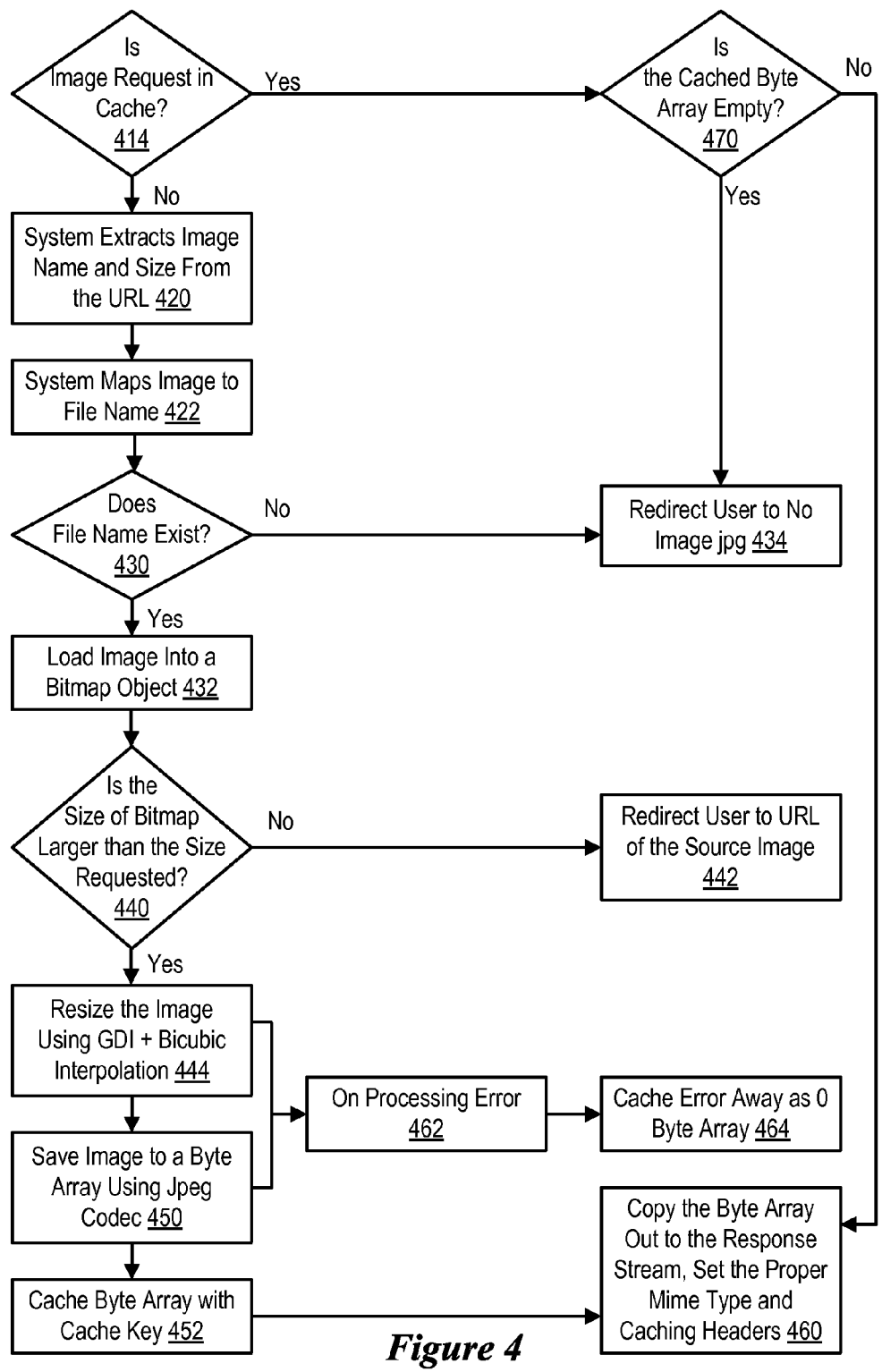
FIG. 4 shows a flow chart of the operation of a system for dynamically resizing information handling system images.

Referring to FIG. 4, a flow chart of the operation of a system for dynamically resizing information handling system images is shown. More specifically, the system initiates a dynamic image presentation when a user requests an image in a pattern of image name and size at step 410. Next a cache key is created for the request based upon a file identifier and a requested size at step 412. Next, the system determines whether an image corresponding to the requested size is stored within the cache at step 414. If the image corresponding to the requested size is not present in the cache, then the system extracts the image name and the size from the universal resource locator (URL) corresponding to the requested image and image size at step 420. The system then maps the image to the file name at step 422.

Next, the system determines whether the file name exists at step 430. If the file name exists, then the image is loaded into a bitmap object at step 432. If the file name does not exist, then the system redirects the user to a no image presentation (e.g., a no image jpg image) at step 434.

After the image is loaded into a bitmap object, the system determines whether the size of the bitmap is larger than the size of the image being requested at step 440. If the size of the bitmap is not larger than the size being requested, then the system redirects the user to the URL of the source image at step 442. If the size of the image is larger than the size being requested, then the system resizes the image using a .net interface and a GDI component (such as GDI+) (e.g., via a bicubic interpolation) at step 444.

Next, the image is saved to a byte array, by for example using a jpeg codec, at step 450 and the byte array is cached with a cache key at step 452. After the byte array is cached with the cache key, the byte array is copied to the response stream, set to a proper mime type and caching header at step 460. The mime type is an image of jpeg file type. The cache header tells the client browser as well as any in between proxies to cache the image until the maximum age or time duration is reached. If there is a processing error at either step 444 or step 450 as determined by step 462, then the system stores a cache error as a zero in the byte array at step 464. The zero byte array is used to bypass loading in future attempts.

If at step 414, the requested image is present in the cache, then the system determines whether the cached byte array is empty at step 470. If the cached byte array is empty, then the system redirect the user to the no image jpg image at step 434. If the cached byte array is not empty, then byte array is copied to the response stream, set to a proper mime type and caching header at step 460

Figure 5:
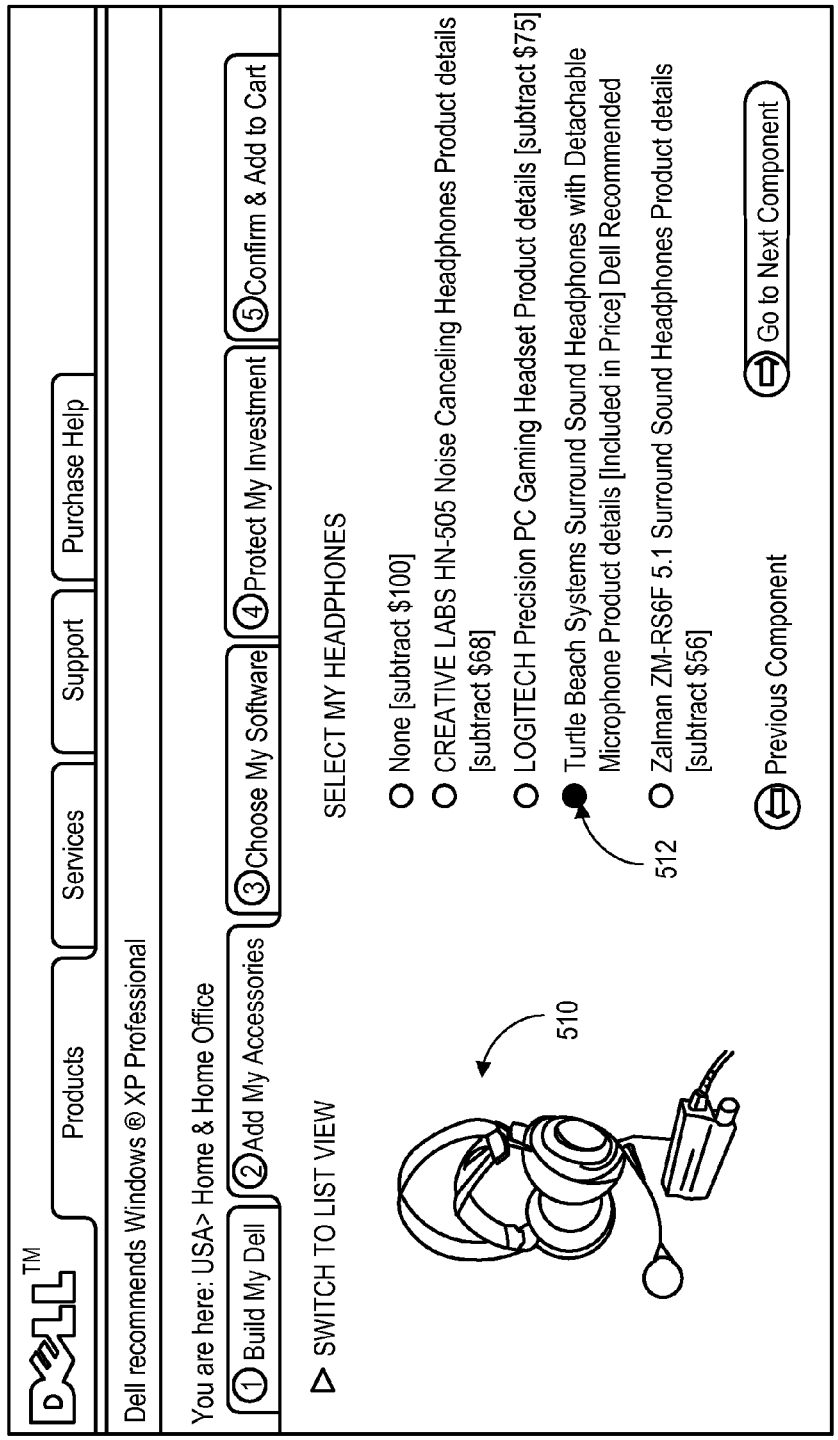
FIG. 5 shows an example screen presentation of an accessories tab within a configurator page which uses an information handling system image.

FIG. 5 shows an example screen presentation of an accessories page which uses an information handling system image. More specifically, the screen presentation 500 includes an image 510 that is presented when a button 512 associated with a name of a device corresponding to the image is selected. In this example, the device is an accessory and more specifically is a set of headphones. It will be appreciated that any image and device may be displayed.

Figure 6:
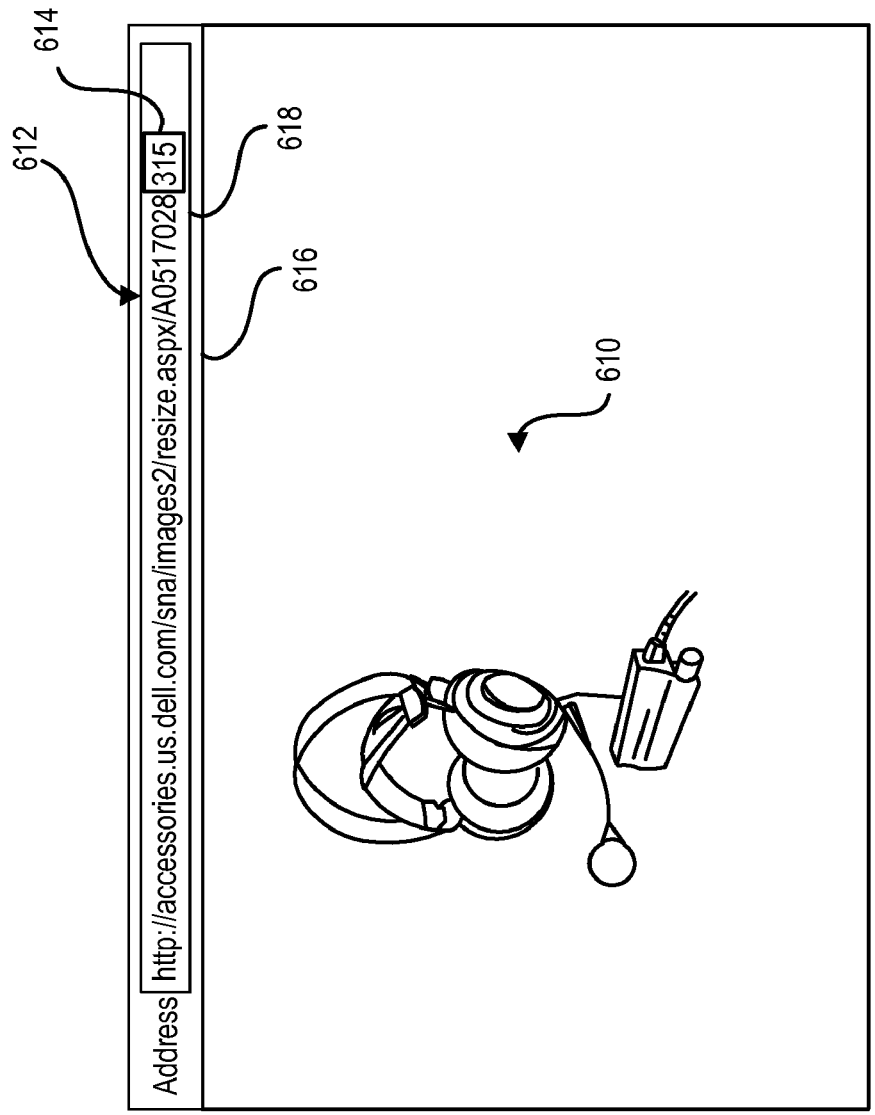
FIG. 6 shows an example of the information handling system image that is used by an application.

FIG. 6 shows an example of the information handling system image that is used by an application. More specifically, the image 610 is accessed via a URL 612 in which the size of the image as well as the name of the image is referenced. This URL may be stored as part of an extended markup language (XML) document that is associated with the an application that is presenting the image. In this example, the image is presented with a size of 315 pixels, as indicated by the size indication 614. This image, with a size of 315 pixels has a corresponding size of 10039 bytes. The URL 612 also includes a resize indication 616 as well as an image identifier 618.

Figure 7:
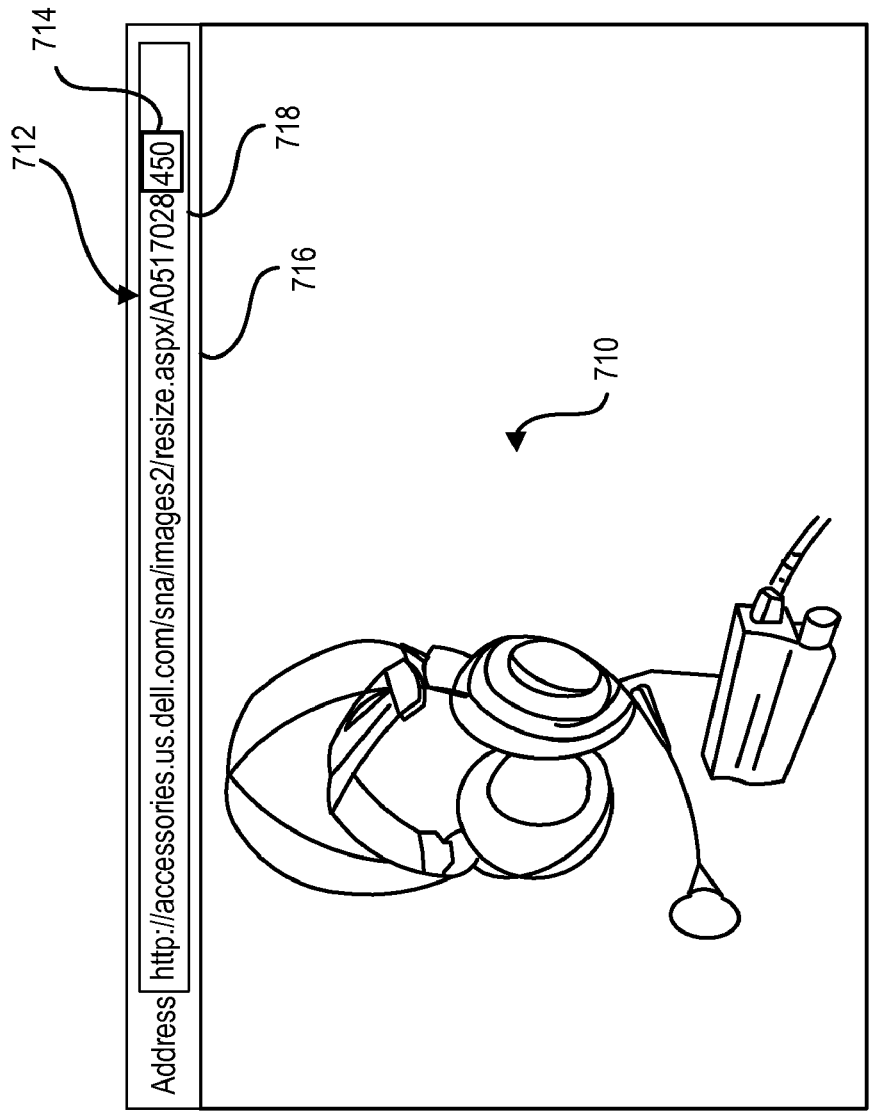
FIG. 7 shows an example of an example of another size of the information handling system image that is used by an application

FIG. 7 shows an example of an example of another size of the information handling system image that is used by an application. More specifically, the image 710 is accessed via a URL 712 in which the size of the image as well as the name of the image is referenced. In this example, the image is presented with a size of 450 pixels, as indicated by the size indication 714. This image, with a size of 315 pixels has a corresponding size of 17763 bytes. The URL 712 also includes a resize indication 716 as well as an image identifier 718. Note that the image identifier 718 is the same as the image identifier 618. This image identifier points to a common location within the image portion 152 of the file system 150.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while the images shown are squares, it will be appreciated that other shapes of images are also contemplated. With other shapes of images, additional information may be included within the image URL which identifiers a shape to which the image will be dynamically adjusted.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A system for enabling configuration of an information handling system comprising:
   a configurator executing on a computer system, the configurator configuring a system with options selected according to user input;
   a dynamic image resize module executing on the computer system, the dynamic resizing module dynamically resizing images for presentation by the configurator,
   a database stored on the computer system, the database receiving information from and supplying information to the configurator; and,
   a file system stored on the computer system, the file system providing images to the dynamic image resize module.

2. The system of claim 1 wherein:
   the dynamic image resize module dynamically resizes images based upon a filename and an image size.

3. The system of claim 2 wherein:
   the filename and the image size are represented within a path of a universal resource locator (URL).

4. The system of claim 2 wherein:
   the dynamic image resize module comprises a dynamic image cache; and,
   the dynamic image resize module determines whether an image corresponding to the filename and the image size is stored within the dynamic image cache.

5. The system of claim 4 wherein:
   if an image corresponding to the filename and the image size is not stored within the dynamic image cache, the dynamic image resize module accesses the file system to obtain a version of the image and resizes the image to correspond to the image size.

6. A computer implemented method of dynamically resizing images comprising:
   accessing, via a computer system, a version of an image based upon a filename;
   dynamically resizing, via the computer system, the version of the image based upon an image size;
   presenting, via the computer system, a resized image.

7. The method of claim 6 wherein:
   the filename and the image size are represented within a path of a universal resource locator (URL).

8. The method of claim 6 further comprising:
   determining whether an image corresponding to the filename and the image size is stored within a dynamic image cache.

9. The method of claim 8 further comprising:
   accessing a file system to obtain a version of the image and resizing the image to correspond to the image size if an image corresponding to the filename and the image size is not stored within the dynamic image cache.

10. The method of claim 6 wherein:
    the image is dynamically resized using bicubic interpolation.

11. The method of claim 6 wherein:
    the dynamically resized image is stored within a dynamic image resize cache for later use.

12. An apparatus for dynamically resizing images comprising:
    means for accessing, via a computer system, a version of an image based upon a filename;
    means for dynamically resizing, via the computer system, the version of the image based upon an image size;
    means for presenting, via the computer system, a resized image.

13. The apparatus of claim 12 wherein:
    the filename and the image size are represented within a path of a universal resource locator (URL).

14. The apparatus of claim 12 further comprising:
    means for determining whether an image corresponding to the filename and the image size is stored within a dynamic image cache.

15. The apparatus of claim 14 further comprising:
    means for accessing a file system to obtain a version of the image and means for resizing the image to correspond to the image size if an image corresponding to the filename and the image size is not stored within the dynamic image cache.

16. The apparatus of claim 12 wherein:
    the image is dynamically resized using bicubic interpolation.

17. The apparatus of claim 12 wherein:
    the dynamically resized image is stored within a dynamic image resize cache for later use.

* * * * *